US012633808B2

(12) United States Patent
Bernhardt et al.

(10) Patent No.: US 12,633,808 B2
(45) Date of Patent: May 19, 2026

(54) SLOT WEDGE, TOOL AND METHOD FOR SIMULTANEOUSLY INSTALLING A WINDING AND THE SLOT WEDGE

(71) Applicant: Innomotics GmbH, Nuremberg (DE)

(72) Inventors: Michael Bernhardt, Bad Neustadt (DE); Vladislav josiek, Havirov (CZ); Klaus Kirchner, Ostheim (DE)

(73) Assignee: Innomotics GmbH, Nuremberg (DE)

( * ) Notice: Subject to any disclaimer, the term of this patent is extended or adjusted under 35 U.S.C. 154(b) by 200 days.

(21) Appl. No.: 18/028,611

(22) PCT Filed: Jul. 16, 2021

(86) PCT No.: PCT/EP2021/070008
§ 371 (c)(1),
(2) Date: Mar. 27, 2023

(87) PCT Pub. No.: WO2022/069092
PCT Pub. Date: Apr. 7, 2022

(65) Prior Publication Data
US 2023/0361658 A1 Nov. 9, 2023

(30) Foreign Application Priority Data

Sep. 29, 2020 (EP) .................................... 20198981

(51) Int. Cl.
*H02K 3/48* (2006.01)
*H02K 3/487* (2006.01)
*H02K 15/13* (2025.01)
(52) U.S. Cl.
CPC ............. *H02K 15/13* (2025.01); *H02K 3/487* (2013.01)

(58) Field of Classification Search
CPC .... H02K 15/03; H02K 15/14; H02K 15/0006; H02K 15/16; H02K 7/183; F03D 13/10
See application file for complete search history.

(56) References Cited

U.S. PATENT DOCUMENTS

| | | | | |
|---|---|---|---|---|
| 3,940,647 A | * | 2/1976 | Keuper | .................. H02K 3/487 |
| | | | | 310/214 |
| 4,955,130 A | | 9/1990 | Bricker et al. | |
| 5,237,740 A | * | 8/1993 | Hayashi | ............... H02K 15/068 |
| | | | | 29/736 |
| 8,256,100 B2 | * | 9/2012 | Mishina | ............... H02K 15/068 |
| | | | | 29/736 |
| 2004/0124730 A1 | * | 7/2004 | Yamaguchi | ............ H02K 15/13 |
| | | | | 310/214 |

FOREIGN PATENT DOCUMENTS

| | | |
|---|---|---|
| DE | 263018 | 6/1916 |
| DE | 102017101381 | 7/2018 |
| JP | 85537576 U | 3/1980 |
| JP | S5914347 | 1/1984 |
| JP | H1023699 | 1/1998 |
| JP | H1023699 A * | 1/1998 |

OTHER PUBLICATIONS

JP-H1023699-A machine translation Dec. 11, 2024.*
PCT International Search Report dated Oct. 28, 2021 based on PCT/EP2021/070008 filed Jul. 16, 2021.

* cited by examiner

*Primary Examiner* — Leda T Pham
(74) *Attorney, Agent, or Firm* — Cozen O'Connor

(57) ABSTRACT
A slot wedge for a slot in a stator of a dynamoelectric machine, wherein the slot wedge is formed as a longitudinally extending strip of insulating material, where the strip is provided with a punched portion.

12 Claims, 9 Drawing Sheets

SLOT WEDGE, TOOL AND METHOD FOR SIMULTANEOUSLY INSTALLING A WINDING AND THE SLOT WEDGE

CROSS-REFERENCE TO RELATED APPLICATIONS

This is a U.S. national stage of application No. PCT/EP2021/070008 filed 16 Jul. 2021. Priority is claimed on European Application No. 20198981.1 filed 29 Sep. 2020, the content of which is incorporated herein by reference in its entirety.

BACKGROUND OF THE INVENTION

1. Field of the Invention

The invention relates to a slot wedge for a slot in a stator of a dynamo-electric machine, where the slot wedge is formed as a longitudinally extending strip made from insulating material.

The invention also relates to a tool for simultaneously installing a winding in the slot and a slot wedge closing off the slot.

The invention furthermore relates to a method for simultaneously installing the winding in the slot and the slot wedge closing off the slot.

2. Description of the Related Art

DE 10 2017 101 381 A1, for instance, discloses a slot wedge and a method for fitting the slot wedge in a stator.

Within the meaning of the invention a slot wedge is understood to mean a sliding cover. A surface insulating material which is formed, in particular as a strip and insulates the winding in the slots, is considered here to be a sliding cover. When windings are fed into a laminated core, for instance, surface insulating materials are likewise also introduced into the slots. A "slot box" is used here as a slot liner. This involves a folded surface insulating material that is adjusted with its cross-sectional formed ideally to the contour of the slot and rests against the slot wall. The slot liner here forms an additional planar electrical barrier between the winding system, in particular between the copper windings made from enameled wire and a magnetically conductive body, such as in the case of a laminated core or a stator.

An introduction of sliding covers or installation of the slot wedge can be divided into a manual procedure and into an automated procedure. With the manual procedure, the sliding cover is attached from the front face of the stator to the slot already populated with a winding and a basic insulation and is inserted axially into the slots. During installation, windings that project slightly from the slot opening slit are pressed into the slot under increased effort.

With a semiautomated variant, the sliding cover is pressed together with the windings into the slot (see, for instance, the German publication DE 26 30 183 A1). A tool is already populated with the sliding covers and prewound coils.

With the conventional prior art, it is disadvantageous for an additional centering and fixing piece to be used, on the one hand or for the sliding cover to have to be held by a retaining ring, on the other hand.

SUMMARY OF THE INVENTION

In view of the foregoing, it is therefore an object of the present invention to simplify installation of a sliding cover compared with the prior art.

This and other objects and advantages are achieved in accordance with the invention by a slot wedge for a slot in a stator of a dynamo-electric machine, which is formed as a longitudinally extending strip made from insulating material, where a punched portion is arranged in the strip.

Within the meaning of the invention, a punched portion is understood to be a structure in the strip, with which either slits or channels are produced via punching or a breakable point is produced via a perforation.

In a particularly advantageous, the punched portion is arranged in a region of the strip that essentially lies within a slot slit region when the strip is positioned in the slot.

The punched portion is formed here such that a hook can engage in the punched portion and can therefore convey the strip along the slot.

It is also conceivable for the punched portion to be arranged in the form of two parallel lines at right angles to the longitudinal axis of the strip. Alternatively, the slot wedge has a punched portion that has a U-shaped configuration and thus almost forms a small window flap.

The inventive slot wedge can be conveyed along the slot with the aid of the punched portion with a fully automated manufacture of a dynamo-electric machine. Populating a tool for preferably simultaneous installation of a winding in a slot and a slot wedge closing off the slot can now occur fully automatically. After retracting the tool, the punched portion springs back again as a result of the internal pressure of the winding. The punched portion that is actually inadmissible for insulation reasons is therefore already partially closed again and, in a subsequent method step, is sufficiently closed off by impregnating the winding using a suitable resin.

Similarly, the objects and advantages are achieved in accordance with the invention by a tool for preferably simultaneous installation of a winding in a slot and a slot wedge closing off the slot, comprising a slot template which is formed on a top side to receive the winding to be installed and is formed on a bottom side by via a receiving surface to receive the slot wedge, where the slot wedge is formed as a longitudinally extending strip made from insulating material, in which a punched portion is arranged, where the receiving surface has a cut-out and the punched portion is arranged above the cut-out so that a hook arranged on the bottom side immerses into the punched portion and as a result provides an engagement for transporting the slot wedge along the slot, and where the slot is closed off by the slot wedge at the same time as the winding is introduced. Advantageously, the slot slit can now be closed off with the inventive sliding cover at the same time as also feeding the winding.

In possible embodiment of the tool, the receiving surface of the slot template has a bevel in the region of the cut-out, where the hook is arranged on a carriage that has a counter bevel. With the aid of the cut-out in the bevel, the hook can immerse in the punched portion while the carriage is sliding over the receiving surface. The hook or the carriage can be pressed against the bevel with springs, for instance.

In accordance with the method, the objects and advantages are also achieved by a method for simultaneously installing a winding in a slot and a slot wedge closing off the slot in which a winding to be installed on a top side of the slot template is arranged via a slot template and, on a bottom side of the slot template, a slot wedge is arranged on a receiving surface, where the slot template is formed as a longitudinally extending strip made from insulating material, in which a punched portion is arranged, where the receiving surface has a cut-out and the punched portion is arranged above the cut-out so that a hook arranged on the bottom side immerses into the punched portion during a forward movement and as a result an engagement is produced for transporting the slot wedge along the slot, and where the slot is closed off by transporting the slot wedge at the same time as the winding is introduced.

In accordance with the invention, there is accordingly a slot wedge punched at a suitable point or a tool for guiding the slot wedge. With the tool with a movable carriage, a hook of the carriage, when this is pretensioned or forcibly controlled for instance, can immerse into the punched portion and therefore convey the slot wedge along the slot. Populating the tool can now advantageously also occur fully automatically. After retracting the tool, the punched portion springs the internal pressure of the winding back again.

Advantageously the sprung-back punched portion, which is in principle actually inadmissible from an insulation perspective, can then be closed off again by using an impregnator to impregnate the winding in the slot.

A significant advantage of the inventive slot wedge (sliding cover) or method presented here is a rapid, simple and reliable installation of the sliding cover, which can be executed in a cost-effective and process-safe manner. The proposed method is suited here both to introduction or insertion movement of the winding sections or the slot wedges (sliding cover) having a radial or axial or also radial and axial movement.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The drawing shows a schematic representation of the invention, in particular in an exemplary embodiment, in which.

DETAILED DESCRIPTION OF THE EXEMPLARY EMBODIMENTS

Figure 1:
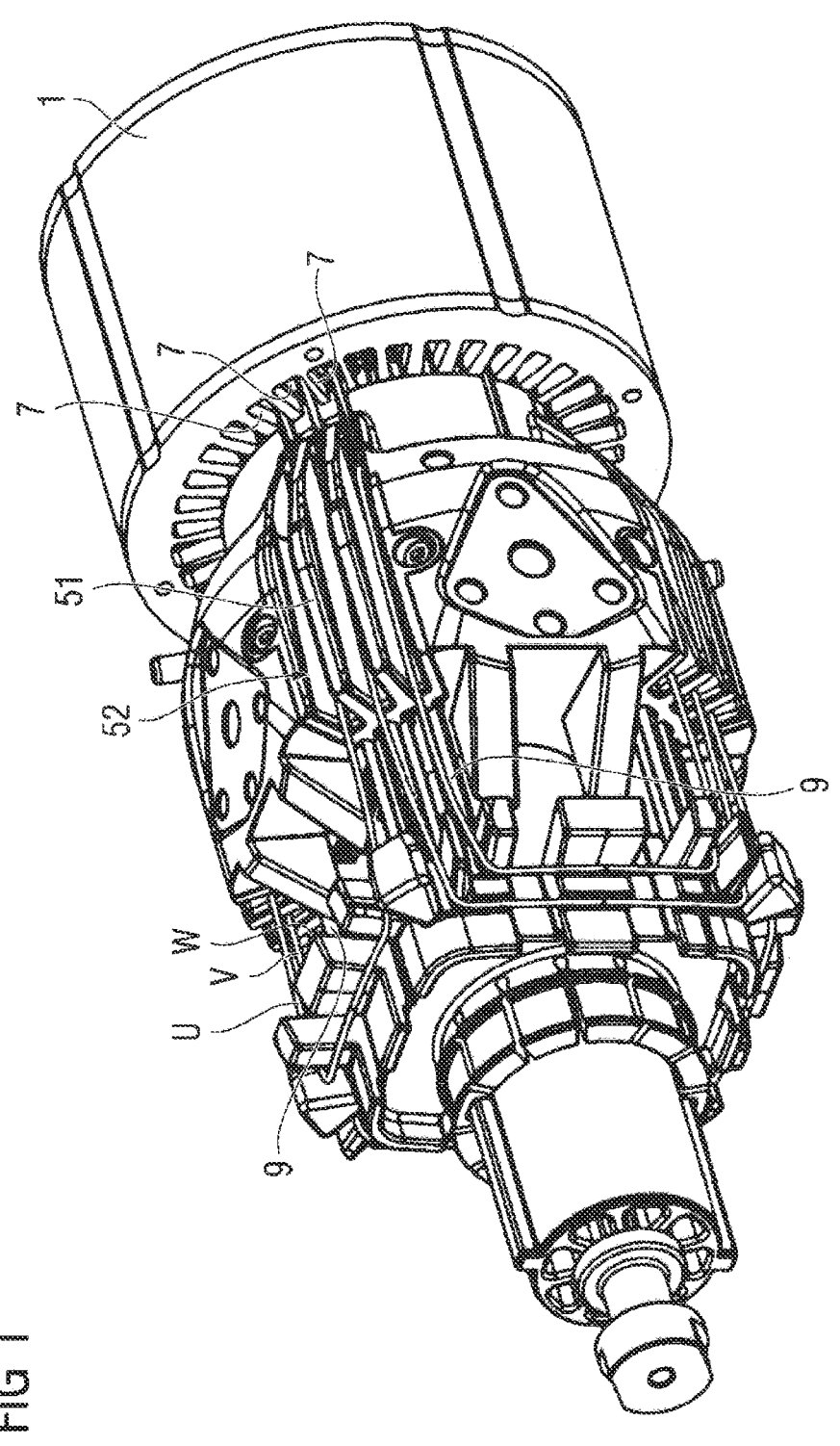
FIG. 1 shows a three-dimensional view of a tool for introducing winding and slot wedge into a stator in accordance with the invention.
Figure 2:
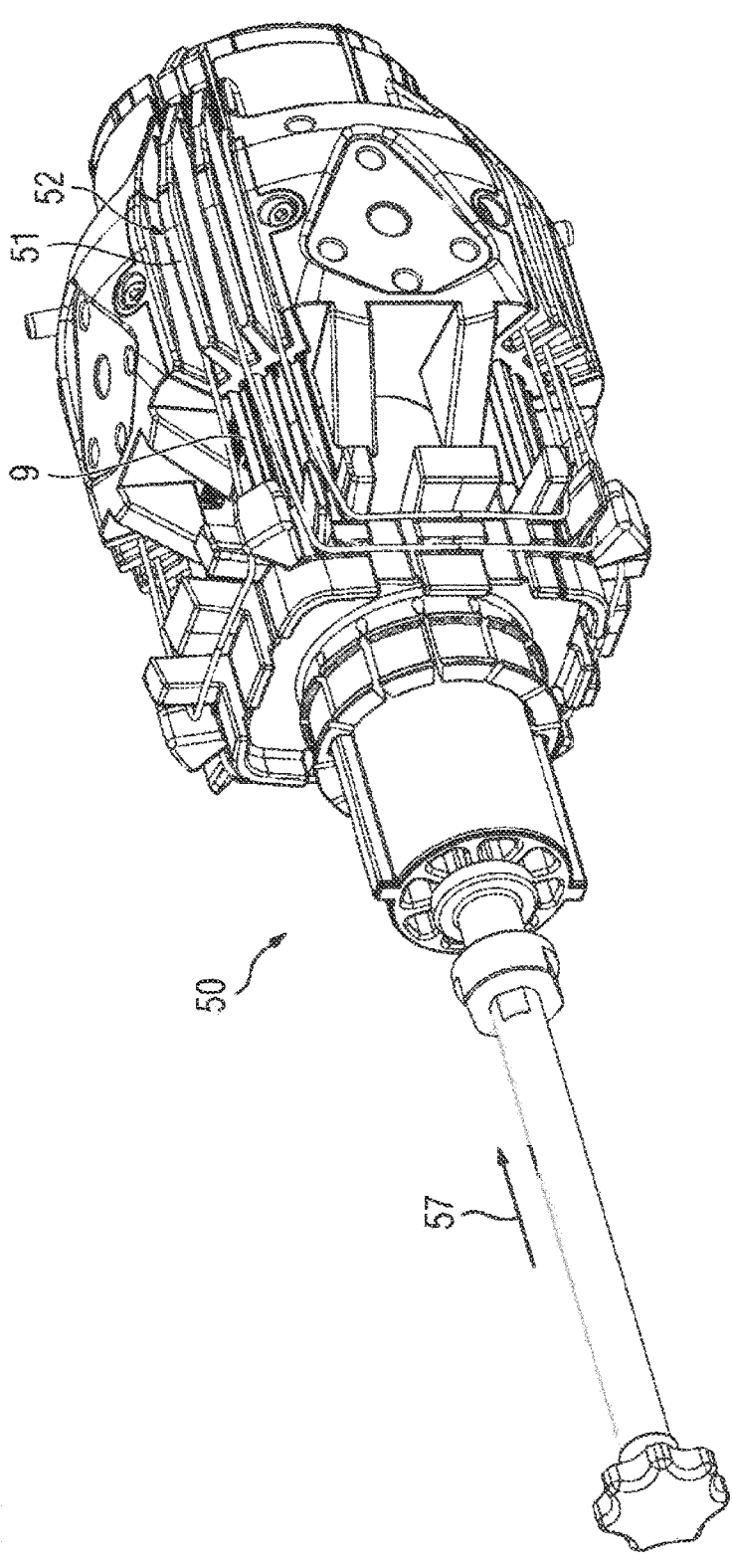
FIG. 2 shows a three-dimensional view of part of the tool of FIG. 1.

With reference to FIG. 1, a fully automated installation of the winding of a dynamo-electric machine can be performed with the aid of the tool 50, which is shown detached from a stator 1 in FIG. 2. For simultaneous installation of a winding u, v, w in a slot 7 and a slot wedge 9 closing off the slot 7, the tool 50 provides at least one tool template 51.

In order to install the windings u, v, w, the slot template 51 has a top side 52, which is configured to receive the winding u, v, w to be installed. Furthermore, the slot template 51 has a bottom side 53, (see also FIGS. 4 and 5), which is formed with a receiving surface 54 that can receive the slot wedge 9. The slot wedge 9 is formed as a longitudinally extending strip made from insulating material, in which a punched portion 6 is arranged. As a result of the receiving surface 54 having a cut-out 55, with a shifting movement of a carriage 21 the punched portion 6 can be arranged above the cut-out 55 so that a hook 20 arranged on an underside 53 immerses in the punched portion and as a result provides engagement 3 for transporting the slot wedge 9 along the slot 7, where the slot 7 is closed off by the slot wedge 9 at the same time (simultaneously) as the winding u, v, w is introduced.

FIG. 2 again shows the principle of feeding with a feeding direction 57, as a result of which the carriage 21 is brought in the direction of the slots 7 with the aid of an inner part.

Figure 3:
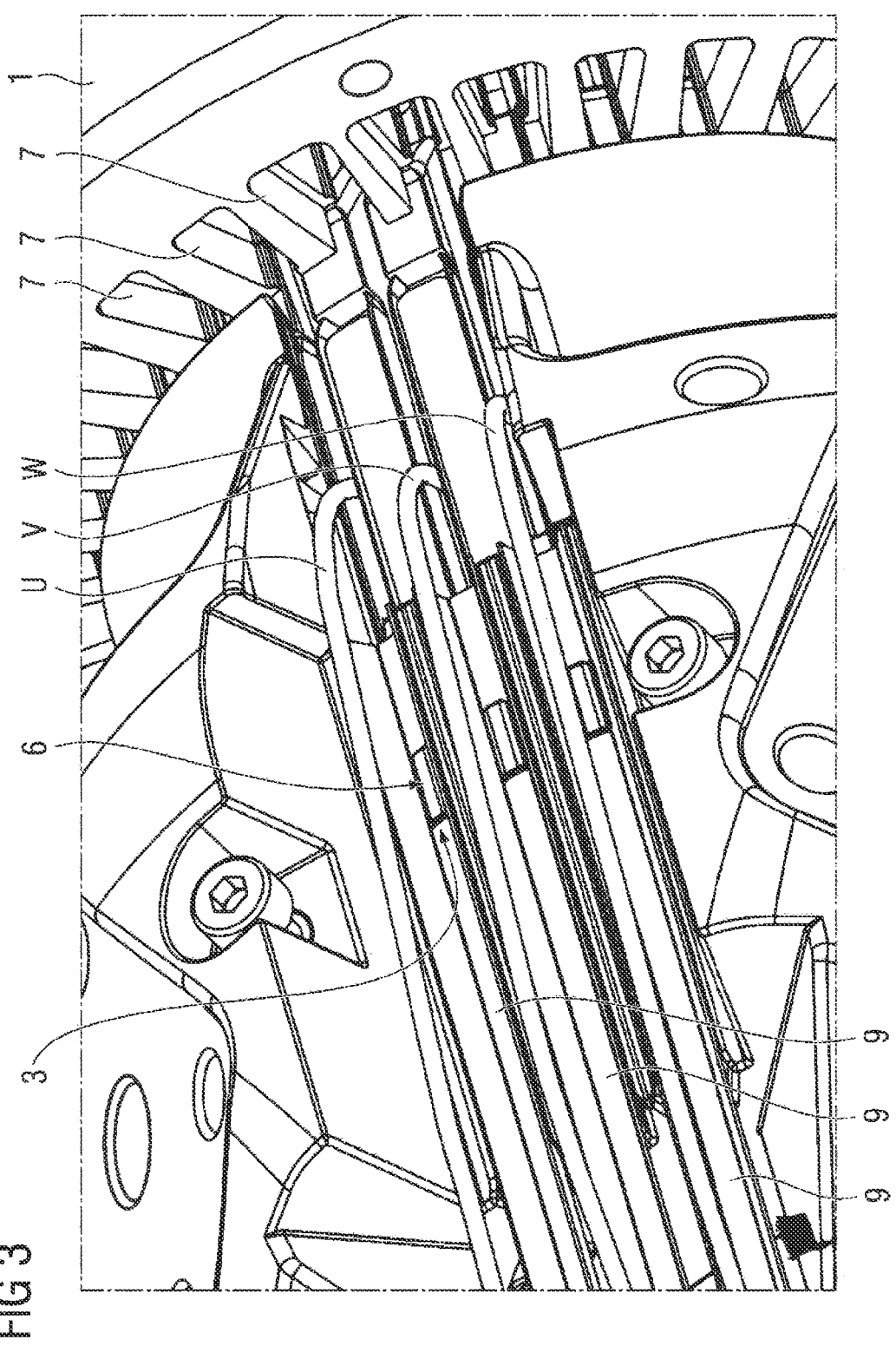
FIG. 3 shows a detailed view of windings and a sliding cover in accordance with the invention.

FIG. 3 shows a more detailed representation of the windings u, v, w resting against the slot wedges 9. For the sake of simplicity, only a conductor of a multi-layer winding is shown with FIG. 3 in each case. The slot wedge 9 is arranged below the windings u, v, w and has the punched portion 6, via which an engagement 3 is produced, which can be moved with a hook 20 by a carriage 21 in the feed direction 57.

Figure 4:
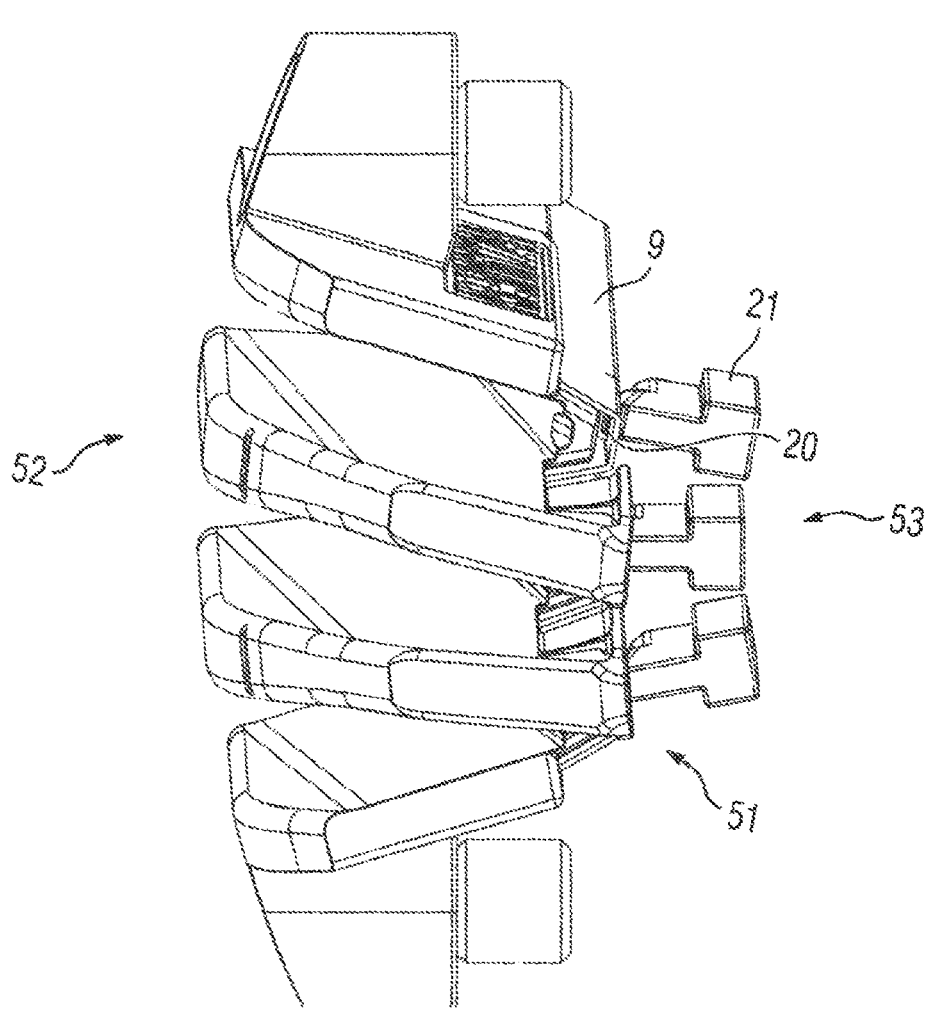
FIG. 4 shows a three-dimensional detailed view of a slot template in accordance with the invention.

FIG. 4 shows a perspective detailed representation of a slot template 51, with the top side 52 for the windings u, v, w and with the bottom side 53 for the slot wedges 9. The hook 20 of a carriage 21 can engage in the engagement 3 of a punched portion 6 of the slot wedge 9 and transport the slot wedge 9 along a slot 7 which is to be closed off.

Figure 5:
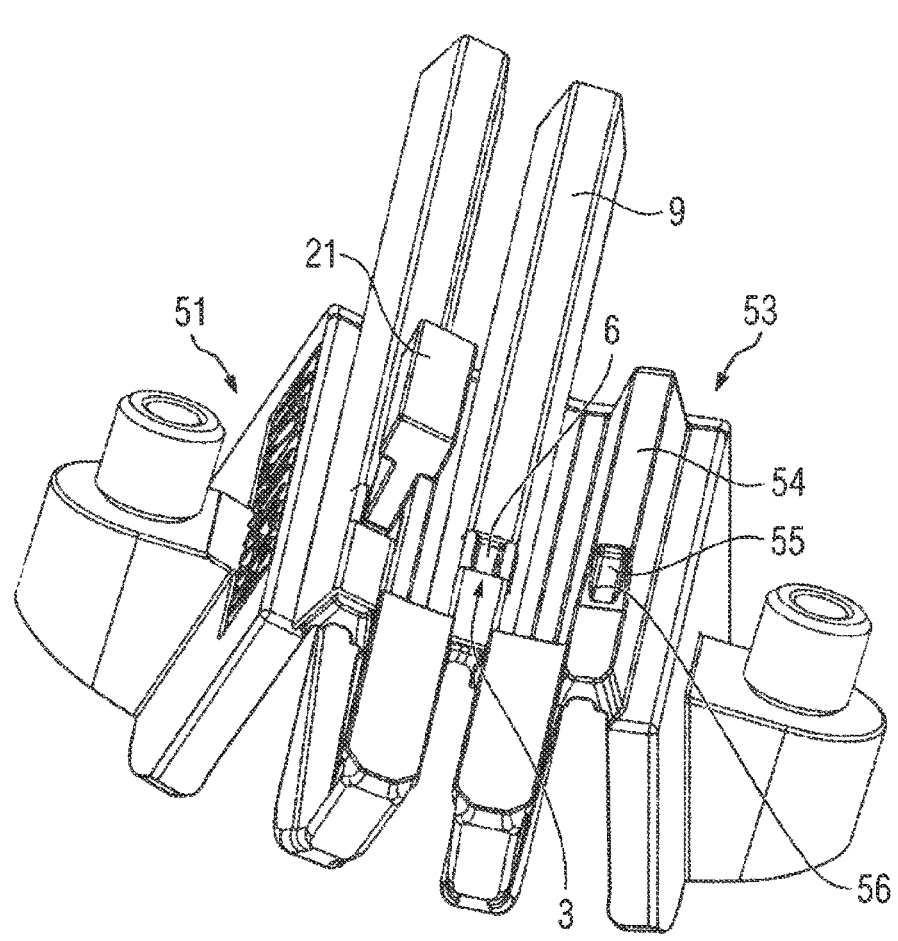
FIG. 5 shows the slot template of FIG. 4 in another perspective representation.

According to FIG. 5, it should be illustrated again how the slot template 51 is formed on its bottom side 53. Essentially, the slot template 51 has three receiving surfaces 54, where a cut-out 55 is arranged in each of the receiving surfaces 54. Here, the punched portion 6 is arranged above the cut-out 55 such that a hook 20 of a carriage 21 that is arranged on the bottom side 53 will immerse in the punched portion 6 during a forward movement and as a result the engagement 3 is produced for transporting the slot wedge 9 along the slot 7.

Figure 6:
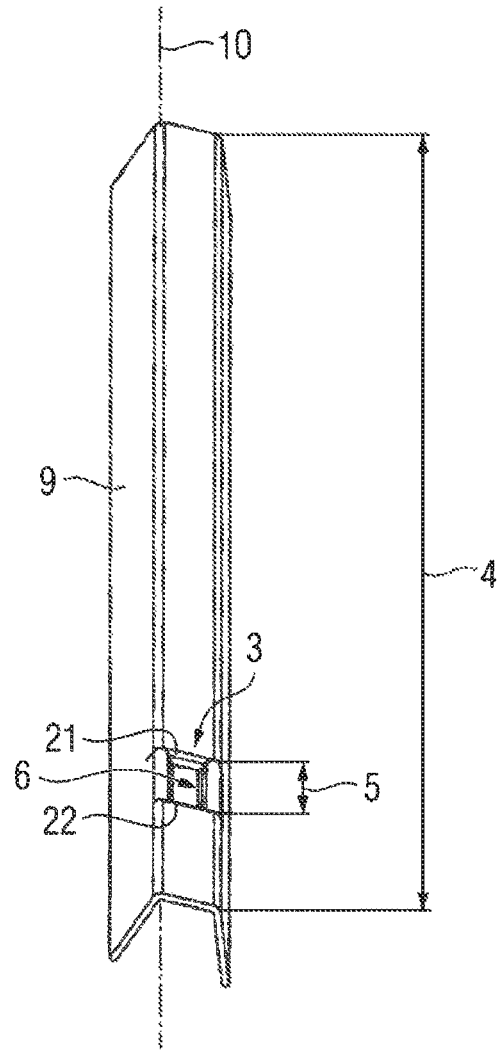
FIG. 6 shows a slot wedge (sliding cover) in accordance with the invention.

FIG. 6 shows a perspective view of the slot wedge 9. The slot wedge 9 is formed to insulate a slot 7 in a stator 1, here it is formed as a longitudinally extending strip made from insulating material. A punched portion 6 is arranged in the strip. The punched portion 6 is arranged in a region 5 of the strip that lies essentially within a slot slit region 4 when the strip is positioned in the slot 7. In an embodiment, the punched portion 6 is arranged in the form of two parallel lines L1, L2 at right angles to the longitudinal axis 10 of the strip.

FIG. 7 again shows the engagement of the hook 20 into the punched portion 6 of the slot wedge 9. The carriage 21 is pressed against the slot wedge 9 by way of a springs 70 and can immerse in the punched portion 6 with the aid of the cut-out 55 provided in the slot template 51.

5

6

Figure 7:
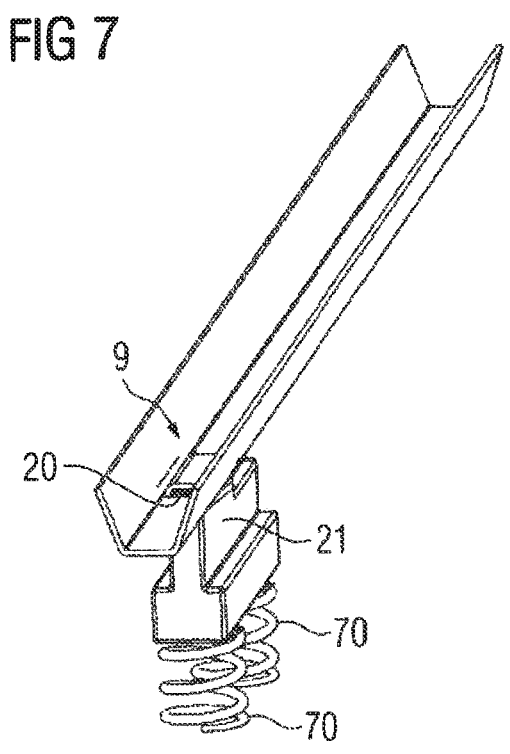
FIG. 7 shows a detailed illustration of the slot wedge with a sliding carriage in accordance with the invention.
Figure 8:
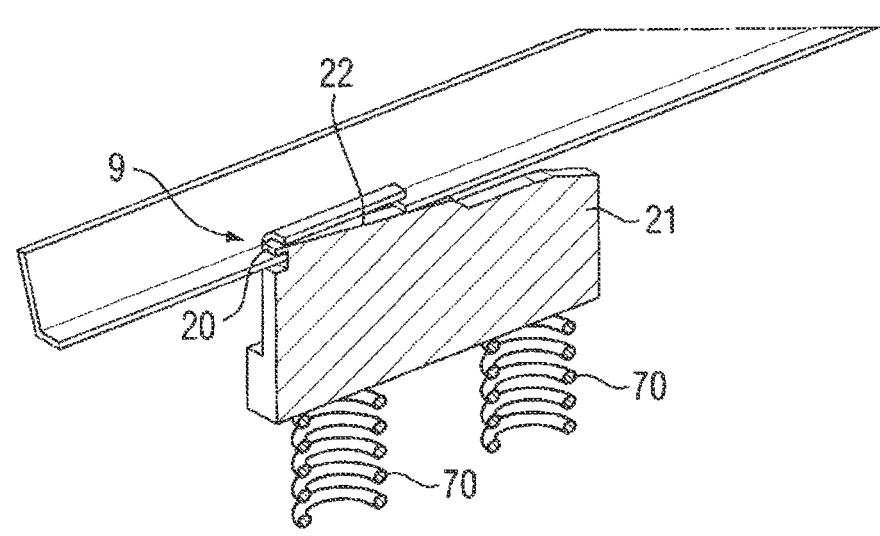
FIG. 8 shows a sectional view of the slot wedge of FIG. 7.

FIG. 8 shows a sectional representation of FIG. 7, where it is emphasized here again that the carriage 21 also has a counter bevel 22 with respect to the bevel 56 in the slot template 51, which benefits the immersion movement.

Finally, FIG. 9 again shows the principle for immersion into the punched portion 6 with the aid of the counter bevel 22 of the carriage 21 and the bevel 56 of the slot template 51.

Figure 9:
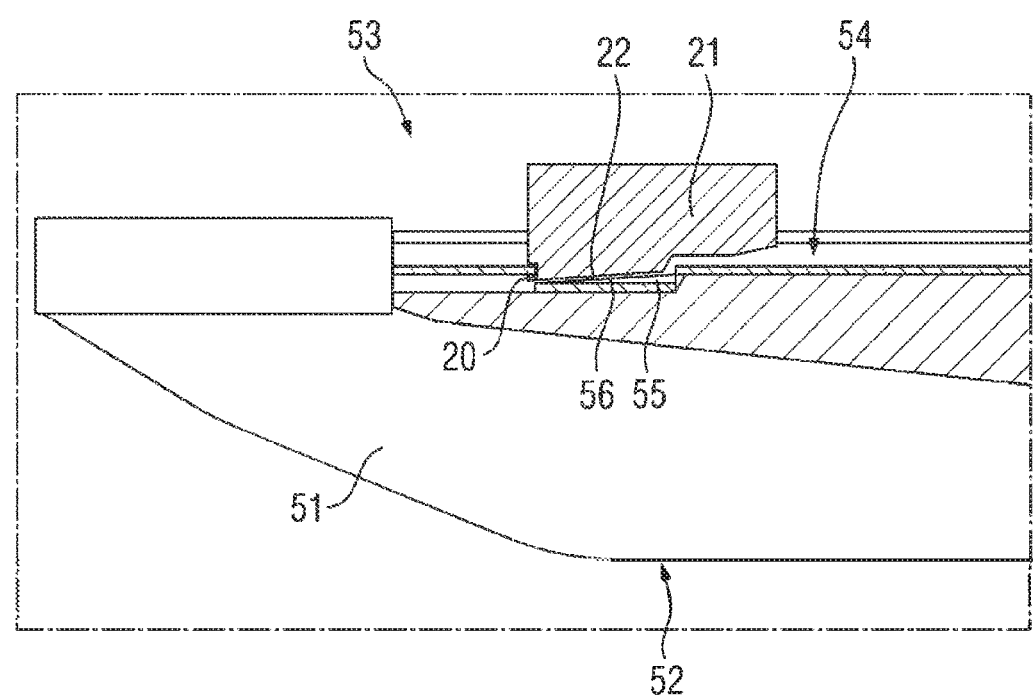
FIG. 9 shows a sectional view of the slot template and carriage in accordance with the invention.

FIG. 9 shows a sectional representation of the slot template 51, where the hook 20 of the carriage 21 is immersed into the punched portion 6. The receiving surface 54 of the slot template 51 has the cut-out 55 in a bevel 56. When moving in the feed direction 57, the carriage 21 with its counter bevel 22 can transport the slot wedge 9 via the hook 20.

Figure 10:
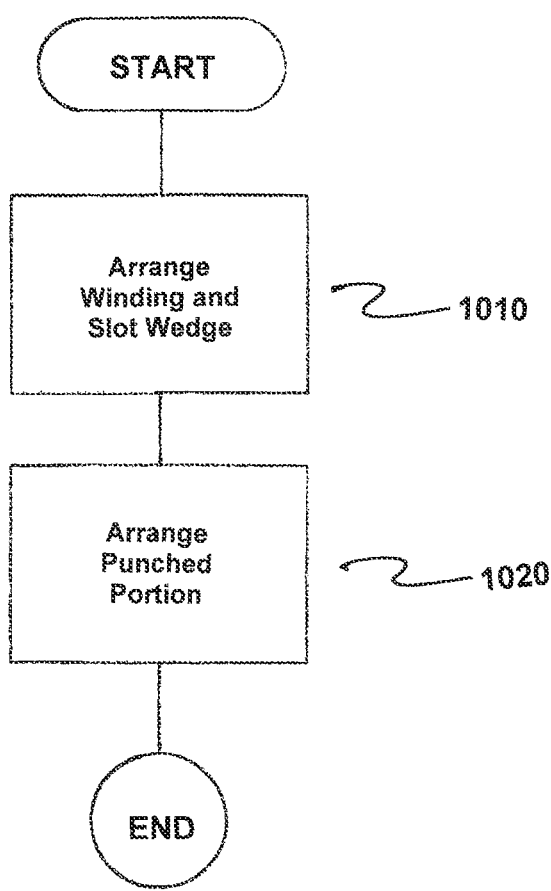
FIG. 10 is a flowchart of the method in accordance with the invention.

FIG. 10 is a flowchart of the method for simultaneously installing a winding u, v, w in a slot 7 and a slot wedge 9 closing off the slot 7. The method comprises arranging a winding u, v, w to be installed on a top side 52 of the slot template 51 via a slot template 51 and arranging a slot wedge 9 on a bottom side 53 of the slot template 51 on a receiving surface 54 via the slot template 51, as indicated in step 1010. Here, the slot wedge 9 is formed as a longitudinally extending strip made from insulating material.

Next, a punched portion 6 is arranged in the longitudinally extending strip made from the insulating material, as indicated in step 1020.

In accordance with the method, the receiving surface 54 includes a cut-out 55, and the punched portion 6 is arranged above the cut-out 55 such that a hook 20 arranged on the bottom side 53 immerses into the punched portion 6 with a forward movement to provide an engagement 3 for transporting the slot wedge 9 along the slot 7. In addition, the slot 7 is closed off by simultaneously transporting the slot wedge 9 when introducing the winding u, v, w in the slot 7.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A slot wedge for a slot in a stator of a dynamo-electric machine; wherein the slot wedge is formed as a longitudinally extending strip made from insulating material; and wherein a punched portion, extending in a same longitudinal direction as sides of the slot wedge and protruding into an interior space formed between the sides of the slot wedge, is arranged in the longitudinally extending strip at a bottom of the slot wedge.

2. The slot wedge as claimed in claim 1, wherein the punched portion is arranged in a region of the longitudinally extending strip which lies essentially within a slot slit region when the longitudinally extending strip is positioned in the slot.

3. The slot wedge as claimed in claim 1, wherein the punched portion is configured such that a hook is engageable in the punched portion to convey the longitudinally extending strip along the slot.

4. The slot wedge as claimed in claim 2, wherein the punched portion is configured such that a hook is engageable in the punched portion to convey the longitudinally extending strip along the slot.

5. The slot wedge as claimed in claim 1, wherein the punched portion is arranged and formed as two parallel lines at right angles to the longitudinal axis of the longitudinally extending strip.

6. The slot wedge as claimed in claim 2, wherein the punched portion is arranged and formed as two parallel lines at right angles to the longitudinal axis of the longitudinally extending strip.

7. The slot wedge as claimed in claim 4, wherein the punched portion is arranged and formed as two parallel lines at right angles to the longitudinal axis of the longitudinally extending strip.

8. The slot wedge as claimed in claim 1, wherein the punched portion has a U-shaped configuration.

9. A tool for installing a winding in a slot and a slot wedge closing off the slot, the tool comprising:

a slot template which is configured on a top side to receive the winding to be installed and is configured on a bottom side via a receiving surface to receive the slot wedge;

wherein the slot wedge is formed as a longitudinally extending strip made from insulating material in which a punched portion is arranged;

wherein the receiving surface includes a cut-out and the punched portion is arranged above the cut-out such that a hook arranged on the bottom side immerses into the punched portion and provides an engagement for transporting the slot wedge along the slot; and wherein the slot is simultaneously closed off by the slot wedge when introducing the winding.

10. The tool as claimed in claim 9, wherein the receiving surface of the slot template includes a bevel in a region of the cut-out; and wherein the hook is arranged on a carriage which includes a counter bevel.

11. A method for simultaneously installing a winding in a slot and a slot wedge closing off the slot, the method comprising:

arranging a winding to be installed on a top side of a slot template via the slot template and arranging the slot wedge on a bottom side of the slot template on a receiving surface via the slot template, the slot wedge being formed as a longitudinally extending strip made from insulating material;

arranging a punched portion in the longitudinally extending strip made from the insulating material;

wherein the receiving surface includes a cut-out, and the punched portion is arranged above the cut-out such that a hook arranged on the bottom side immerses into the punched portion with a forward movement to provide an engagement for transporting the slot wedge along the slot; and wherein the slot is closed off by simultaneously transporting the slot wedge when introducing the winding in the slot.

12. The method as claimed in claim 11, wherein after introducing the slot wedge, the punched portion is then closed off again by impregnation with an impregnator of the winding in the slot.

* * * * *